Sept. 8, 1931. F. M. GUY 1,822,026
VIBRATION DAMPER
Filed Aug. 2, 1929
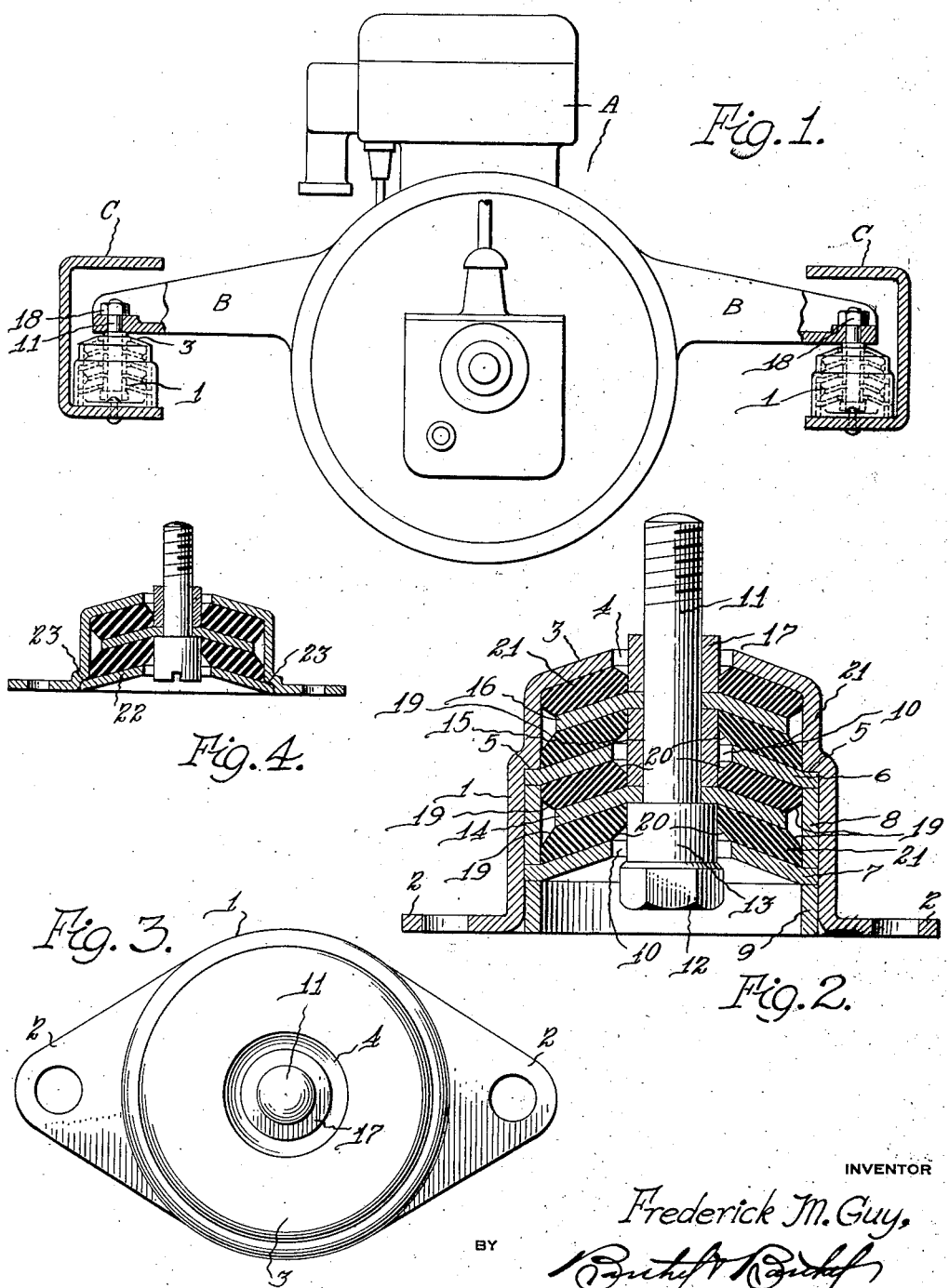
INVENTOR
Frederick M. Guy,
BY
ATTORNEYS Patented Sept. 8, 1931

1,822,026

UNITED STATES PATENT OFFICE

FREDERICK M. GUY, OF DETROIT, MICHIGAN, ASSIGNOR OF ONE-HALF TO TREVOE G. MURTON, OF DETROIT, MICHIGAN

VIBRATION DAMPER

Application filed August 2, 1929. Serial No. 383,120.

The present invention relates to devices for preventing the transmission of vibrations from one member or device to another, and more particularly to devices of this character especially adapted for interposition between a motor or other vibration producing machine and its support, to prevent, as in a motor vehicle construction, the transmission to the vehicle chassis frame of the vibrations set up by the motor in its operation.

An object of the present invention is to prevent the transmission of vibrations from the supported to the supporting member or members, by interrupting all metal paths through which such vibrations would otherwise be transmitted, and to provide, in a device embodying rubber or similar yielding parts, for the expansion of such parts while confined against horizontal or vertical displacement, thus providing a firm anchorage between the supported and supporting members or parts. It is also an object to so construct and arrange a device wherein elements formed of rubber or other yielding material are employed, that each element will yieldingly resist, by resistance to compression, both vertical and horizontal relative movement between the supporting and supported members. A further object is to provide a device especially adapted for supporting an internal combustion engine upon a chassis frame in motor vehicle constructions, which device is simple in construction, cheap to manufacture, efficient in operation, and will have long life.

With the above and other ends in view, the invention consists in the arrangement within a suitable casing, of a plurality of strata of yieldable material so arranged and confined as to completely insulate the motor or machine from its support, all metal to metal contact paths which would transmit vibrations being interrupted by such strata, and further consists in providing an arrangement of such strata whereby each layer is permitted to expand under compression and will be compressed by both vertical and horizontal loads thereon, the device thus serving to securely anchor the motor to its support against lateral as well as vertical movement. The invention also consists in certain other new and useful features in the construction and arrangement, all as hereinafter set forth and more particularly pointed out in the appended claims, reference being had to the accompanying drawings in which Figure 1 is a view illustrating the application of a device embodying the present invention, and shown in side elevation, to a motor vehicle construction;

Fig. 2 is a transverse vertical section through the device detached;

Fig. 3 is a plan view of the device; and

Fig. 4 is a sectional view similar to Fig. 2 and illustrating a modified construction.

As illustrating one use to which the present invention may be put, and for which use the device in the form shown is particularly adapted, in Fig. 1 an internal combustion engine indicated as a whole by the letter A is shown as supported in the usual manner by laterally extending arms B within a chassis frame of a motor vehicle, said frame being of the channel type and indicated at C. It will be understood however that devices embodying the present invention may be constructed for application in use to the supporting of other devices or machines which are subject to vibration in use.

In Fig. 1 the device illustrative of the present invention is shown as being interposed between each arm B of the motor and the lower or supporting flange of each of the channel frame members C. This device or vibration damper as shown in Figs. 2 and 3, comprises a cylindrical casing 1 having laterally extending ears 2 at its base for the securing of the casing in upright position within the channel C upon the lower flange thereof. This casing 1 is formed with an upper end wall 3 having an axial opening 4, said wall extending in an inwardly and upwardly inclined position, and the cylindrical side wall of the casing is offset intermediate its ends to provide an internal shoulder 5. Annular plates 6 and 7 are rigidly secured at their outer edges to the casing 1 within said casing by seating the edge of the plate 6 upon the shoulder 5 between said shoulder and the upper end of a ring 8, the lower plate 7 being seated between the lower edge of the ring 8 and a similar ring 9, which seats at its lower edge upon the surface to which the casing is secured, said rings 8 and 9 fitting closely within the casing and thus rigidly supporting the annular plates 6 and 7 within the casing. Each of these plates is of truncated conical form, that is they are dished so that when in place within the casing they extend inwardly from the wall thereof and upwardly in an inclined position corresponding to the inclination of the end wall 3 of the casing. Each plate is also formed with an axial opening 10 corresponding in diameter to the opening 4 in the casing end wall.

A bolt 11 is provided for securing the arm B of the engine A to this supporting device, said bolt passing downwardly within the casing through the openings 4 and 10 and provided with a head 12 on its lower end and an enlarged neck portion 13 adjacent the head, which neck portion forms a shoulder upon which is seated a conical disk 14, said disk having an axial opening to receive the bolt and held rigidly to its seat on the bolt by means of a sleeve 15 on the bolt seated at its lower end upon the upper side of the disk. A second and like disk 16 is sleeved upon the bolt and seated upon the upper end of the sleeve 15, this disk being rigidly held by a second sleeve 17 on the bolt, the lower end of which engages the upper side of the disk and the upper end of which projects through the opening 4 in the casing and engages the lower side of the arm B. A nut 18 on the upper end of the bolt 11 which passes through an opening in the arm B, is turned up to firmly draw the bolt toward the arm and thus firmly clamp the sleeves 15 and 17 and interposed disks 14 and 16, between the shoulder on the bolt and the lower side of the arm B.

The disks 14 and 16 which are spaced midway between the plates 6 and 7 and the end wall 3 of the casing, are of less diameter than the internal diameter of the casing, so that a space is provided between the outer edges of the disks and the wall of the casing. Interposed between the disks and the adjacent plates and also between the upper disk 16 and the end wall of the casing is a plurality of annular members 21 formed of rubber or other suitable resilient material with the inner edges of these annular members engaging the sleeves 15 and 17 and the neck portion 13 of the bolt, and engaging at their outer edges the wall of the casing and spacer ring 8. The corners 19 of these annular resilient members are cut away adjacent the peripheral edges of the disks 14 and 16 and the inner corners of these rubber rings are cut away as at 20 adjacent the opening 10 in the plates 6 and 7. An annular space is therefore provided at the outer edge of each disk and at the inner edge of each plate to provide clearance spaces or expansion chambers permitting the lateral expansion of the rubber rings under compression. Each of these rubber rings 21 is placed under compression in the assembling of the device, and as each spans the space between the sleeve on the bolt and the wall of the casing, said bolt is held thereby centrally of the casing, and due to the cup or conical shape of the several disks, plates and end wall of the casing, any lateral movement of the bolt is resisted by the entire body of each rubber ring. The motor is therefore held against lateral movement by the resistance to compression of the several rubber rings in the casing, and as the bolt or its sleeves are spaced from the inner edges of the plates 6 and 7 and also the edge of the opening 4 in the end wall, and as the peripheral edges of the disks 14 and 16 are spaced from the wall of the casing, the bolt, sleeves and disks are therefore insulated by the rubber rings from the casing wall and plates 6 and 7. Therefore vibrations of the engine will not be transmitted to the chassis frame, as there is no metallic path through which these vibrations may be transmitted, such path being interrupted throughout the length of the securing bolt by the several rubber rings.

Each arm of the motor is therefore securely anchored to the chassis frame but supported thereon by the several rubber rings which are interposed between the disks and plates within the casing, and as these disks and plates are of conical formation, any lateral thrust tending to move the securing bolt laterally of the casing will be effectually resisted by the rubber strata interposed between these inclined surfaces, any such lateral pressure tending to compress the body of each rubber ring throughout its entire width as well as to compress it by the engagement of its inner and outer edges with the bolt and casing wall. The entire weight of the motor is taken by the end of the sleeve 17 which engages the underside of the motor arm and which projects a short distance beyond the upper end of the casing to provide clearance between the casing and arm. The motor is therefore supported yieldingly, but this yielding movement is very restricted due to the fact that the rubber rings are placed in the casing under compression.

A simplified construction of the device shown in Fig. 2, is disclosed in Fig. 4, there being only two rubber strata or rings and a single disk 14 secured upon the bolt 11 between these rings, the upper ring being interposed between the inclined end wall 3 of the casing and the disk on the bolt, and the lower ring being seated upon a conical disk 22 secured at its outer periphery between the lower flange of the channel member upon which the casing is secured, and a shoulder 23 formed by an offset in the wall of the casing. This simple device will provide ample support and anchorage for engines of comparatively light weight, and it will be understood that the diameter of the casing and rubber rings may be increased or diminished according to the weight to be supported thereby, the anchorage bolt in either of the constructions shown being completely insulated from the casing, so that no metallic path is formed between the motor arm and the chassis frame for the transmission of vibrations from the motor to the frame.

It is obvious that changes may be made not only in the size, proportion and number of parts, but also in the shape and arrangement of the parts, within the scope of the appended claims, without departing from the spirit of the invention, and I do not therefore limit myself to the particular construction shown.

Having thus fully described my invention, what I claim is:—

1. A vibration damper including a casing, strata of rubber-like material confined in said casing, an axial anchoring member, and a rigid member on said anchoring member and interposed between said strata, the strata-confining portions of the casing and said member having their respective strata-contacting faces extending angular to the axis of the damper, the opposite faces of the member being parallel.

2. A vibration damper including rubber-like strata, means confining said strata and providing surfaces engaged by said strata at one side, and an anchoring member providing a rigid portion in contact with the opposed sides of said strata, the strata-confining portions of the casing and said member having their respective strata-contacting faces extending angular to the axis of the damper, the opposite faces of the member being parallel.

3. A vibration damper including alternating rubber-like strata and rigid conical members, and an anchoring member secured centrally to certain of said conical members, said conical members having their respective strata-contacting faces extending in parallelism.

4. A vibration damper including spaced apart rigid conical members, an anchoring member, a rigid conical member on said anchoring member between and spaced from said conical members, and rubber-like strata between the opposed surfaces of said conical members, said conical members having their respective strata-contacting faces extending in parallelism.

5. A device of the character described including a cylindrical casing having inwardly extending spaced apart rigid portions provided with axial openings, an anchoring member extending through said openings into the casing with a space between said member and the edges of said openings, a rigid member on said anchoring member and extending between and spaced from said rigid portions on the casing and spaced from said casing, and strata of yieldable material between said rigid portions and rigid member to hold said anchoring member centrally of the casing and insulated therefrom, the strata-confining portions of the casing and said member having their respective strata-contacting faces extending angular to the axis of the damper, the opposite faces of the member being parallel.

6. A device of the character described including a cylindrical casing having a conical end formed with an axial opening, a conical member rigid with the casing and spaced from said conical end and provided with an axial opening, an anchoring member extending into the casing through said opening in the end wall and through said opening in said conical member and spaced from the edges of said openings, a conical disk on said anchoring member within the casing and projecting between and spaced from said casing end and said conical member with its peripheral edge spaced from the cylindrical wall of the casing, and resilient rings interposed between said disk and said casing end and conical member, said conical members having their respective strata-contacting faces extending in parallelism.

7. In a device of the character described, the combination of a casing, opposed conical members in said casing arranged in spaced apart overlapping relation, an anchoring member secured to certain of said conical members, and annular rubber-like members between said conical members and contacting said casing and anchoring member at their inner and outer peripheries, portions of said annular members being cut away adjacent the inner and outer peripheries of said conical members to expose said peripheries, and provide expansion spaces for said rubber-like members, whereby the annular members will be maintained free from compression stress application by such peripheries under stress produced by relative lateral movement of casing and anchoring member.

8. In a device of the character described, the combination of a cylindrical casing, spaced apart conically formed members rigid with said casing at their peripheries and each having an axial opening, an anchoring member extending into said casing and through said openings with a space between said member and said conical members at each opening, a conical disk rigidly secured axially to said anchoring member and projecting between and spaced from said conical members on the casing, and rubber strata interposed between said disk and said conical members under compression, said disk being of less diameter than the internal diameter of said casing and strata being cut away at the corners thereof adjacent the periphery of said disk and adjacent said openings in said conical members on the casing to expose said peripheries and provide inner and outer annular chambers for the expansion of said rubber strata whereby the annular members will be maintained free from compression stress application by such peripheries under stress produced by relative lateral movement of casing and anchoring member.

9. In a device of the character described, the combination of a cylindrical casing having a conical end provided with an axial opening, a conical plate within the casing secured at its periphery to the casing and formed with an axial opening, an anchoring bolt extending into the casing loosely through said opening in the conical end thereof and through said opening in the conical plate, a conical disk seated against a shoulder on said bolt, a sleeve on the bolt engaging said disk opposite its seat and extending outward through the opening in the end of the casing with a space between the edge of said opening and said sleeve, said disk being of less diameter than the internal diameter of the casing to provide a space between its periphery and casing wall, and ring members formed of rubber-like material between the opposed sides of said conical casing end, said disk, and said plate, said rubber rings being cut away adjacent said axial openings in the casing end and plate and also cut away adjacent the periphery of said disk to provide inner and outer annular expansion chambers, said rubber rings being of a width to fit closely between the cylindrical casing wall and said anchoring member and sleeve thereon.

In testimony whereof I affix my signature.

FREDERICK M. GUY.